(No Model.)
G. BLASER.
UNICYCLE.
No. 462,295. Patented Nov. 3, 1891.
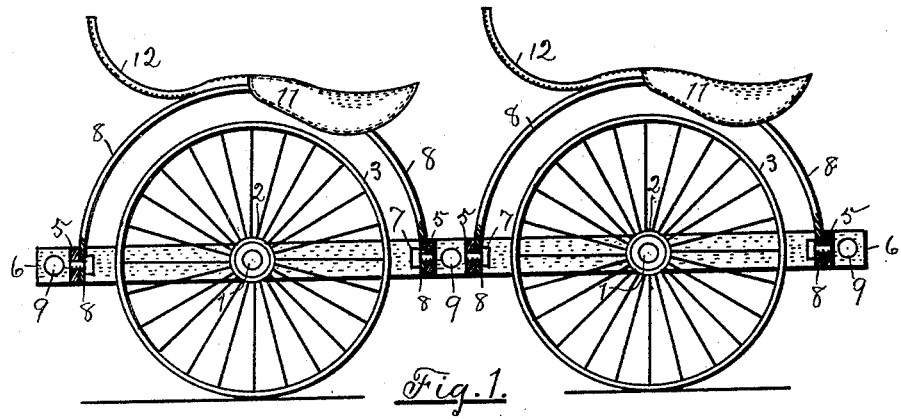
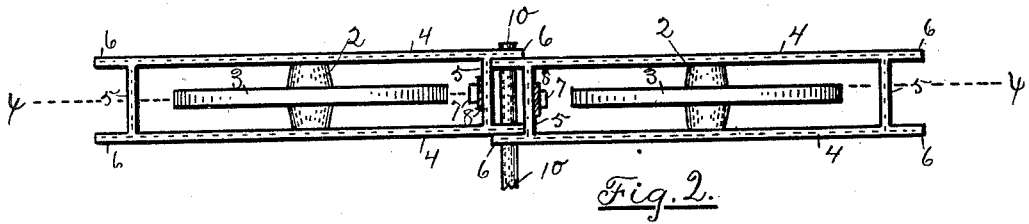
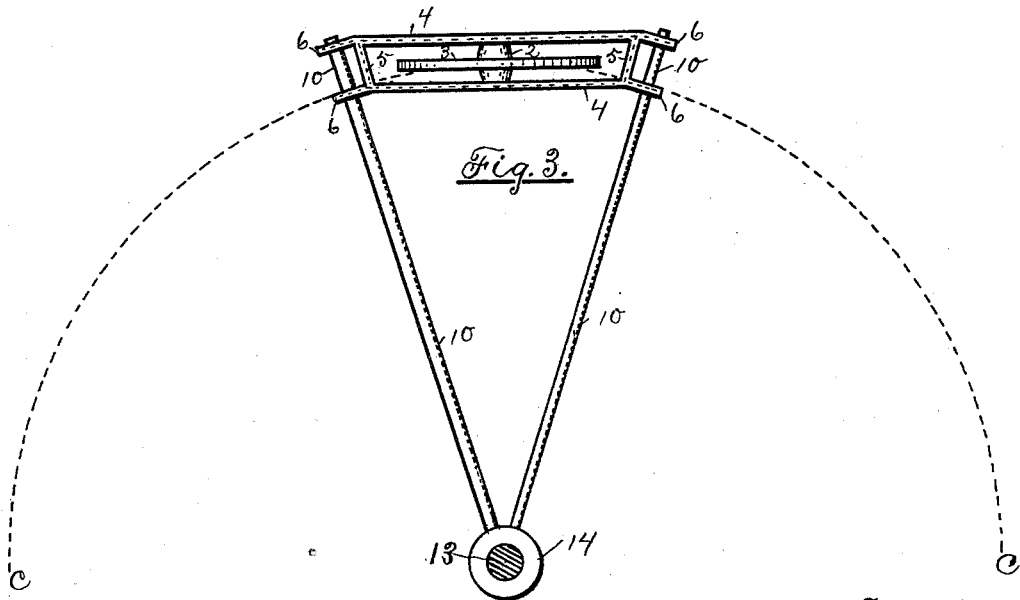
Witnesses
Henry F. Senger.
Katie B. Ringold.
Inventor
Gustav Blaser,
By Attorney
E. P. Robbins, M.E.

UNITED STATES PATENT OFFICE.

GUSTAV BLASER, OF CINCINNATI, OHIO.

UNICYCLE.

SPECIFICATION forming part of Letters Patent No. 462,295, dated November 3, 1891.

Application filed November 17, 1890. Serial No. 371,771. (No model.)

*To all whom it may concern:*

Be it known that I, GUSTAV BLASER, a citizen of the United States, residing at Cincinnati, in the county of Hamilton and State of Ohio, have invented certain new and useful Improvements in Unicycles; and I do hereby declare the following to be a full, clear, and exact description of the invention, such as will enable others skilled in the art to which it appertains to make and use the same.

My invention relates to improvements in unicycles.

The object of the invention is to devise a unicycle for the special purpose of use by children and others desiring to learn to ride them.

Figure 1 is a side view showing two unicycles connected together tandem, the framing being in section along the plane $x\ x$, Fig. 2. Fig. 2 is a plan view of the main framing. Fig. 3 is a plan view showing one unicycle connected to a device arranged to rotate horizontally around a center.

The same numbers indicate the same parts in different figures.

1 is the axle, 2 the hub, and 3 the tire, of the wheel.

4 5 6 is the main framing, within which the wheel runs and is mounted. The frames 4 5 6 are made rectangular in form and have end projections 6, by which two frames placed end to end, as shown in Figs. 1 and 2, may be connected together. They are connected together by means of the holes 9 and bolts 10, Figs. 2 and 3. By making the projections 6 of uniform length and form any two frames can be immediately and easily fitted and fastened together. By making the ends of the projections 6 square with the edges, as shown in Figs. 1 and 2, the said ends may abut against the sides of the cross-frame parts 5, and thus hold the several connected frames securely together without any vertical motion or play.

13 is any suitable stationary bearing or spindle, about which the boss 14 is arranged to turn. Arms 10 are rigidly connected to the boss 14 in any suitable manner and project radially any desired distance.

The unicycle-frames 4 5 6 are connected to their ends, as shown in Fig. 3. One unicycle only may be so connected and used alone, or any number may be connected to the boss 14 by means of rods 10. When a complete circle of unicycles is formed the device will be adapted for a considerable number of riders, and may be used for profit in the same manner as a "Flying Dutchman" and other similar devices.

$c\ c$ is a dotted circle indicating the path of the wheels.

The frames 4 5 6 may be secured on the ends of the rods 10 by friction when driven in place, or nuts may be placed on the ends of the rods 10.

8 are flat seat-supports connected at their ends to the cross-frame parts 5 of the frames 4 5 6 by means of bolts 7.

11 is any suitable seat or saddle attached to the support 8.

12 is a handle bar or support, which may be suitably attached to the bar 8 or to the saddle 11, or be made integral with the saddle.

Since handles and treadles constitute no part of the invention, they are not shown.

Fig. 2 shows an arrangement where the frames are adapted to connect in a manner for the unicycles to run in a straight line, while in Fig. 3 the projections 6 are bent sidewise, so that the wheels can be arranged to run in a circle. A short rod 10 can be held in the hand, and thus a bicycle be guided when teaching pupils to ride.

I claim—

1. In a unicycle, the combination of a wheel, an axle, a rectangular frame having exterior end projections with eyes, and a transverse guiding and propelling rod secured in the said eyes, substantially as set forth.

2. The combination of two or more unicycles, each having a wheel, an axle, and an independent frame having end projections with eyes, the frames being removably connected together end to end by means of transverse rods, substantially as set forth.

3. The combination of a unicycle having a rectangular frame with end projecting frame parts having eyes, a stationary bearing, a boss turning on the bearing, and rods rigidly connected to the boss and secured in the eyes of the unicycle-frame, substantially as set forth.

In testimony whereof I now affix my signature in presence of two witnesses.

GUSTAV BLASER.

Witnesses:
  EDWARD P. ROBBINS,
  HENRY F. LENZER.